(12) United States Patent
Pereymer (10) Patent No.: US 9,141,591 B2
(45) Date of Patent: Sep. 22, 2015

(54) PUBLISHING ON MOBILE DEVICES WITH APP BUILDING

(76) Inventor: Arsen Pereymer, Brooklyn, NY (US)

(*) Notice: Subject to any disclaimer, the term of this patent is extended or adjusted under 35 U.S.C. 154(b) by 379 days.

(21) Appl. No.: 13/566,054

(22) Filed: Aug. 3, 2012

(65) Prior Publication Data

US 2013/0227390 A1   Aug. 29, 2013

Related U.S. Application Data

(60) Provisional application No. 61/602,368, filed on Feb. 23, 2012.

(51) Int. Cl.
*G06F 17/22* (2006.01)

(52) U.S. Cl.
CPC .................................. *G06F 17/2247* (2013.01)

(58) Field of Classification Search
CPC .......... G06F 17/30607; G06F 17/3089; G06F 17/30289
USPC .......................................... 715/234, 255, 854
See application file for complete search history.

(56) References Cited

U.S. PATENT DOCUMENTS

| | | | |
|---|---|---|---|
| 8,250,527 B1* | 8/2012 | Gubbay et al. ................. | 717/113 |
| 8,756,497 B2* | 6/2014 | Le Chevalier et al. ........ | 715/255 |
| 8,896,623 B2* | 11/2014 | Kim et al. ...................... | 345/619 |
| 2001/0056463 A1* | 12/2001 | Grady et al. ................... | 709/203 |
| 2004/0205695 A1* | 10/2004 | Fletcher ......................... | 717/105 |
| 2004/0267595 A1* | 12/2004 | Woodings et al. .............. | 705/9 |
| 2005/0069225 A1* | 3/2005 | Schneider et al. ............. | 382/305 |
| 2008/0307340 A1* | 12/2008 | Kojima et al. ................. | 715/764 |
| 2009/0276805 A1* | 11/2009 | Andrews, II et al. ........... | 725/35 |
| 2009/0282077 A1* | 11/2009 | Thomas ...................... | 707/104.1 |
| 2012/0240243 A1* | 9/2012 | Allardyce ........................ | 726/28 |
| 2012/0276880 A1* | 11/2012 | Angorn et al. ............. | 455/414.1 |
| 2012/0278142 A1* | 11/2012 | Li ................................ | 705/14.1 |
| 2013/0013499 A1* | 1/2013 | Kalgi .............................. | 705/41 |
| 2013/0124972 A1* | 5/2013 | Le Chevalier et al. ........ | 715/234 |
| 2013/0226979 A1* | 8/2013 | Caruso et al. ................. | 707/827 |
| 2013/0256403 A1* | 10/2013 | MacKinnon Keith ........ | 235/375 |
| 2013/0290149 A1* | 10/2013 | Rashwan ...................... | 705/27.1 |
| 2014/0279411 A1* | 9/2014 | Bertanzetti et al. ............. | 705/39 |
| 2014/0297836 A1* | 10/2014 | Cohen et al. .................. | 709/224 |

OTHER PUBLICATIONS

Quark.com, "Quark Xpress 9" with App Studio, Dec. 5-9, 2011, pp. 1-9   http://www.quark.com/Products/QuarkXPress/Features/Digital_Publishing.aspx.*

(Continued)

*Primary Examiner* — Scott Baderman
*Assistant Examiner* — Mario M Velez-Lopez
(74) *Attorney, Agent, or Firm* — Israel Nissenbaum; Yitzy Nissenbaum (57) ABSTRACT

A publisher accessible e-publishing system and method, configured to enable a publisher to construct and make an app available for permitting enhanced viewing and interactive utilization of e-published content on various mobile devices with various software platforms, the system comprising a front end and a back end with the front end being configured to be used by a publisher to provide content and selection of parameters for display and use with the e-published content and the back end being a system which is configured to store the content and meta data for the content and which is configured to configure the content into an end user app specifically conformed to the specific viewing platform and device being used by the end user to view and interact with the e-published content.

10 Claims, 3 Drawing Sheets

(56) References Cited

OTHER PUBLICATIONS

Smashing Magazine, "HTML5 and The Future of the Web", Jul. 16, 2009, pp. 1-8 http://www.smashingmagazine.com/2009/07/16/html5-and-the-future-of-the-web/.*

Appmakr.com, "App makr beta", Dec. 2, 2011, pp. 1-2 http://www.appmakr.com/.*

Zamar.com, "Free Online File converter", Jan. 1, 2012, pp. 1 http://zamzar.com/.*

The Database Normalization Process, as available Dec. 2007, pp. 1-5 http://www.informit.com/articles/article.aspx?p=30646.*

* cited by examiner

FIG. 1

| 51 One Finger Double Tap — Show Menu and Page Index | 52 Two Finger Single Tap — Show Hotspots | 53 Three Finger Single Tap — Show Instructions |
|---|---|---|
| 54 Hotspot Tap — Activate Hotspot | 55 Pinch — Zoom In/Out of Page | 56 Swipe Left — Go to Previous Page |
| 57 Swipe Right — Go to Next Page | 58 Rotate to Landscape — Show 2-page View | 59 Rotate to Portrait — Show 1-Page View |

PUBLISHING ON MOBILE DEVICES WITH APP BUILDING

FIELD OF THE INVENTION

This invention relates to the simplified, formatted, publishing of electronic or digital media including web content or e-materials as well as print material on mobile devices and particularly tablet devices.

BACKGROUND OF INVENTION

Users consume written or graphic content in various ways. Traditionally such consumption has been by way of reading or viewing of physically printed materials on paper. Recently, reading on physical print media has been overtaken by electronic reading on the web (or off-line by downloaded reading content), by means of a desktop computer, laptop or electronic reading devices. Sales of e-books have, in fact, overtaken sales of the traditional paper based books.

As a more recent phenomena, consumption of content, in digital form, including newspapers and magazines, on tablet computers and other mobile devices has grown exponentially. It is expected that in the very near future, mobile/touch devices will be the overwhelming primary medium with which users will be reading content.

Impeding such transition is the fact that currently not all content is presented in a mobile and touch friendly manner. Actual formatting of the converted print material or even electronic or digital or e-type of materials from one type of electronic device (e.g., from pc or laptops to readers or tablets), or the web, is often perceived as being unprofessional, uneven, and viewably sloppy. This results in a negative perception and a poor user-experience and a lack of acceptance, which affects perception of the publisher. In many instances, content in its current form, is not even viewable on mobile devices or specialized versions in different unsatisfying formats are made specifically for the mobile device.

It has therefore become imperative that content publishers, having a printed, electronic, digital or e-material content base or web content base, in order to economically survive, need to incorporate into their publishing strategy, facilitated procedures for e-publishing the originally content (whether printed or in electronic or digital form or as web content). This is of particular importance with respect to publishing on mobile/touch devices, such as smartphones and, on the increasingly popular tablet computers or readers. The publishing strategy needs to also include not only making content available on these devices but also the enhancing of an e-reading experience, by adding device centric capabilities such as touch gestures, accelerometer uses or use of the GPS functions.

However, publishers who are scrambling to make their content presentable on mobile devices have very limited operational choices available to them. Most often the publishers are required to hire mobile developer specialists to code applications to work on the devices. This is however, very costly and time consuming and not economically available to smaller publishing outfits, and is even less available to individuals. A need has therefore arisen for the development of a platform and process by which tablet and mobile publishing can be made economically and viable available to all sources of e-publishable content and even to those who are not technically proficient.

SUMMARY OF INVENTION

Preliminarily, the following terminology is utilized herein as follows:

Native App

A mobile application, which can run on the native operating system for the specific device. For example, a native iOS app is an app which can run on iOS devices such as an iPhone, iPod Touch, iPad. Another example, is a native Android App, which can run on the android operating devices such as the Motorola, LG, and Samsung family of devices.

HTML5 App

A series of web pages written using the HTML language and using the version 5 of HTML tags. The web pages can be viewed on computer (i.e. laptop/desktop) web browsers as well as mobile web browsers.

Publisher

The actual user of the platform who builds the app for reader viewing and interaction.

End-User/Reader

The user who actually uses or reads the end result app produced/built by the publisher using the platform.

Hotspot/Hotspot Region

A hotspot or hotspot region is a given region on the touch screen of a mobile device or computer touch screen which, when the end-user taps that given region, an action happens. For example, a hotspot may comprise a photo gallery in which a photo album or stream of pictures opens when the user taps on a region. This region can be defined as being anywhere on the screen page.

Hotspot Type

A hotspot type is a type of hotspot the publisher selects to define. Various hotspot types will be exemplified hereinafter.

It is an object of the present invention to provide a method and system for app creation for publishers to be able to functionally and expeditiously transfer to, or initially provide, published content to a variety of mobile devices, with various native operating systems and HTML5 language for enhanced reading of content and with interactive capabilities via app access.

It is a further object of the present invention to provide such method and system for app creation without dedicated programming and programmers and with full mobile device dedicated formatting and touch control for various functions.

It is yet another object of the present invention to provide a publisher accessible system, preferably on a web site, configured to enable a publisher to construct and make an app available for permitting enhanced viewing and interactive utilization of e-published materials or content on various mobile devices with various software platforms.

It is still yet another object of the present invention to provide an e-publishing system having a front end and a back end with the front end being used by a publisher to provide content and selection of parameters for display and used with the e-published content and the back end being a system which stores the content and meta data for the content and configures the content into an end user app specifically conformed to the specific viewing platform and device being used by the end user to view the e-published content and to interact with it.

Generally the present invention comprises a method and system for publishers to be able to functionally and expeditiously transfer to or initially provide content to a variety of mobile devices, with various native operating systems as well as HTML5 language by creation of an app accessible to reader/users. The method comprises the steps of:

a) providing an accessible site, preferably on the web, through which a publisher is able to provide page images of the content to be transferred to the mobile devices and to provide parameters encompassing desired viewability and desired interactive capability, and operation;

b) configuring the accessible site to be capable of analyzing the input page images and desired parameters and to convert the input p'ages to be dimensioned and formatted according to viewing requirements of various available software platforms and mobile device types of various configurations;

c) configuring the accessible site to provide the converted input pages with hot spots of various selected types at pre-selected locations on the page, for interactive operation therewith by reader users;

d) the accessible site thereafter creating an app for dissemination by the publisher, with the app enabling readers or users to optimally view converted content and to interact with hotspots on different mobile devices, operating with different platforms, the app being available to the readers or users on the mobile device being used with specific platform being used.

The tablet-publishing platform of the present invention (the term "tablet" includes all mobile and e-viewable media) is configured to greatly facilitate the manner in which content publishers, whether of print or e-materials or web content such as magazines, newspapers, books, text books, interactive books, brochures, or other web content, blogs, and other publications are published and consumed on tablet and mobile platforms.

The platform is particularly geared toward individuals and small publishing businesses or businesses with publishing requirements, to allow them to easily publish their content on touch devices of various types and sizes. The platform is comprised of an application or app (as currently commonly referred to) builder, which is a comprehensive web-based toolset designed for non-technical publisher/users to add interactive and complex features to their publications quickly and easily.

The by-product is most commonly and most popularly, a native iPad, Android and HTML, particularly HTML5, app. HTML5, as an advanced form of HTML, which allows for imbedded videos, photo galleries, animations and the like. Typically, an app of this type, normally requires hiring a mobile app development company. However, by using the platform of the present application, the same or better quality app can be produced in less than 45 minutes, without any technical knowledge. The cost of producing the app in this manner is only a fraction of what it would typically cost to hire a mobile app development company.

In accordance with the present invention the publisher/user utilizes the "existing" content to create the app and the platform technology to make the existing content consumable in a friendly format designed specifically for the touch device, based on the device specifications (i.e. screen size, device capabilities, etc.). By using a web-based toolset the publisher/user uploads or configures content and then the platform, using its process technology, to make the content consumable on touch devices. In further accordance with the method of the invention, once the publisher/user finishes defining the app properties, app design aspects, and more importantly uploading/defining the content, the publisher/user requests publishing of the app on the supported mobile platforms. The request is sent to a process which instantiates the mechanism which actually builds the app for the requested mobile platform(s).

The following are the most prevalent Supported Mobile Platforms for which the e-publishing system and app formation of the present invention is typically applicable:

Native iOS App:
This is a native universal app, which works on current mobile products, specifically an iPhone and on an iPad. Once created by the publisher the app is made available to end users on a suitable site such as the Apple App Store and Apple Newsstand app.

Native Android App
This is an app adapted to operate on Android mobile phones and on an Android Tablet. This app is made available to end users on sites such as Android Marketplace.

HTML5 App
This app, configured for HTML5 becomes a web app [html5 app], which is then viewable on any touch device, which supports HTML5.

The back end of the system of the present invention, which analyzes and stores content and meta-data, utilizes a server with peripheral components. The server components include:

Database:
The database is comprised of many normalized tables, which store essential information about the app, and more importantly store the content and/or links to the content in a normalized fashion.

Web Services (APIs)
The web services provide the interface so that the native applications and html5 are enabled to retrieve the stored content with the app in a proper format.

Native App
The native app, when formed and made available, is comprised of OS-specific SDK code (i.e. iOS, Android), which handles all the logic, functions, features, and other workings of the app. The data is completely extracted from the app and the app is configured with a unique identifier, which is then used to contact a server-based API to fetch the content for the app. The content is then stored locally on the device to accommodate use of the app when no Internet connection is available.

HTML5 App
The HTML5 app is comprised of a series of HTML5 tags and JavaScript functions, which handle all the logic, functions, features, and other working of the app, with the data being completely extracted from the app. The HTML5 app resides in a pre-determined URI-location designated for the specific app and contains a unique identifier, which is used to fetch the content of the app from a server-based API.

DETAILED DESCRIPTION OF THE INVENTION

Once the publisher has accessed the web or other access site for the submission of content and desired parameters, in a front end process, the submitted materials and parameters are stored and analyzed by the back-end of the system (i.e., Builder Technical Implementation) with the nearly immediate creation of an app for distribution by the publisher to end users to access on various platforms and mobile devices with optimal formatting and operation.

Builder Technical Implementation:
The builder sub-system is a web-based interface which a publisher/user can access using a computer or a mobile web browser, to build his app. The builder sub-system is comprised of a series of front-end web pages, which can be written in any browser compatible language, but is commonly written in HTML and JavaScript. The builder sub-system contains a back-end database which stores the information as provided by the publisher/user. The following outlines a preferred embodiment with which the back end system processes content of various types:

PDF Processing:

The system takes publisher/user-uploaded PDF and creates an image representation by creating an image file on a file system, for each page within the PDF. The system then optimizes each image representation to the optimal image properties for the supported devices to be viewable on. (i.e., optimizes it for iPad, iPhone, Android, Android Tablet, Computer Web Browser, Mobile Web Browser, etc.). After processing the PDF and creating an image file for each of the pages within the PDF, the physical files are stored in a configurable location on a file server behind a firewall. For each page, a record is created in the page table and associating the page with an issue in the issue table. The system then stores the logical file information namely: filename, type, and page count in a page file table.

Article Processing

For each article defined by the publisher/user, the system stores meta-data of the article information namely: title of article, page number beginning, and associated issue, in the article table whereby the articles can be accessed by an end user.

Hotspot Processing

Among the parameters selected by the publisher, whether standardized or customized, the published content may be provided with interactive hot spots, which permit the end user to access imbedded videos, photo galleries, animations, etc. For each hotspot defined by the publisher/user, the system stores the geometry (i.e. X, Y, width, height) in a hotspot table, which is configured according to processing system and accessing mobile devices. For each hotspot content item provided by the publisher/user, the system stores the content information in the hot spot content table, and associates it to that hotspot in the hotspot table. For each hotspot property, the system stores the layout in a layout hotspot table, and any overlay in an overlay placement table Publishing Processing In the publishing process, the system marks the app as "requested to be published" and sends out an email notification to an administrator. The publishing sub-system polls the system on a predetermined interval basis to determine which apps need to be built. The publishing sub-system fetches the next available app to be built and creates the configuration file containing the AppID. The publishing sub-system compiles the app using the native OS code and saves the app in preparation to submission to an app store.

Native App Technical Implementation

Because of the various software and operating system platforms in mobile devices, the present system takes into account the particular platform, when building the app and each app is dedicated to the particular platform. Accordingly, there is a separation of code base in order to customize usage for mobile devices geared for use with the particular platforms.

Separation of Code Base

The native app (i.e. iOS and/or Android) is comprised of a code base in which the code logic, publisher/user-interface and data are completely separated from each other.

Configuration

The app has one configuration file which lets the app know where to fetch the content and data for the app.

The Configuration file typically consists of:

```
<dict>; <key>AdditionForMD5</key>;<string>[THE MD5
KEY]</string>; <key>AppID</key>; <string>[THE APPID]
</string>; <key>SecretKey</key>; <string>[THE SECRET KEY]
</string>; <key>WebServiceURL</key>;<string>[THE WEB
SERVICE URL]</string>;</dict>
```

The manner in which the app, as activated by an end user, accesses the published material is typically outlined as follows:

App Launch Process

The app code connects to the web service. The design properties are then fetched and the design properties are applied. Publications (i.e., issues) are fetched, when available for sale, with the downloaded and purchased publications being fetched. The publications for sale are rendered in the store view with the publications downloaded and purchased are rendered in the library view as based in the library view.

Publication View Process

When the user taps on the publication to view it, the system fetches the page images, based on the following image-fetching algorithm:

1. Fetch current page
2. Fetch current page+2 (in preparation for the possibility of the user going to a next page so performance is kept optimal)
3. Fetch current page−2 (prepares for the possibility of the user going to a prior page so performance is kept optimal)
4. Fetch current page hotspot information
5. Fetch current page+1 hotspot information
6. Fetch current page−1 hotspot information The system preferably stores the pages on the local file system of the device, in order to increase performance during the app use and to also allow for offline reading when the mobile device is not connected to the Internet.

When the end user instantiates the pages index view, the system fetches thumbnails of each page within the app and renders the page in the layout (i.e. scroll view, cover-flow view) as chosen by the publisher user during the original building process.

When the end user taps on a page within the page index, the system fetches the page image and presents the page to the user and instantiates the page image-fetching algorithm as presented above.

Hot Spot Designations Allows for Interactive Viewing of the Publication

The end-user executes various types of finger swiping or tapping gestures to initiate a desired action. The type of gesture the end-user performs, will determine the action. Many of the following gestures and tapping procedures have been established in the industry for particular operations and actions:

Tap Action

When a user taps anywhere on the physical device, the code base determines if the location of the tap is a hotspot region. If the tap is within defined hotspot geometry boundaries, the app determines the type of hotspot and appropriate actions are then initiated.

Two-Finger Single Tap Action

When a user does a single-tap with two fingers, the hotspot region boundaries are shown for each finger hotspot and appropriate actions are then effected.

Hotspot Types

In preferred embodiments the publisher/user is provided with the ability to define the layout to use based on platform and mobile devices being use. The platform is designed to easily allow extensions and scalability of layouts.

Figure 1:
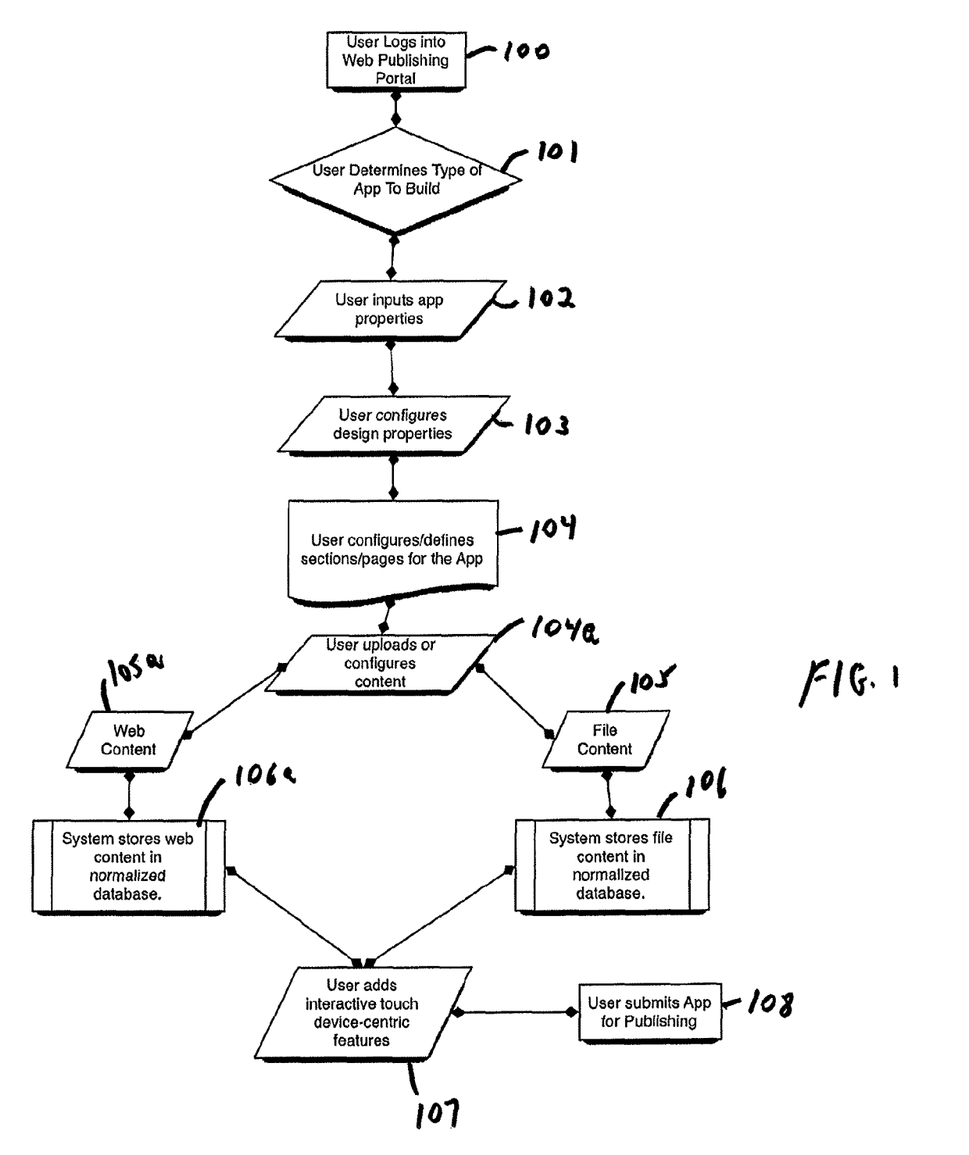
FIG. 1 is a flow chart of a High-level App Building Process of the present invention.

Examples of hotspot interactive operations and opening of viewing files, hyperlinks, information, operations, etc., include the following:
  Photo Gallery
  Video Gallery
  Audio Gallery
  RSS
  Textbox
  Info pop-up
  Map
  Internal Page Links
  Web Links
  Tap-to-call
  Tap-to-email
  Forms An Overall Process Overview of the system of the present invention includes a front end providing of content and designated parameters and a back end of analyzing the provided content and parameters, with storing content and configuring the system for an app to be used with optimal performance for different platforms and mobile devices. The process is described as follows, with reference to the flow chart of FIG. 1:

At 100, a publisher/user logs into a web-based interface or portal using a computer or a mobile device. The publisher/user, at 101, determines the type of app for the system to build and inputs the app properties at 102. The design properties are configured at 103 with the publisher/user configuring/defining section/pages for the app. At 104 and 104*a* the publisher/user uploads or configures content. File content at 105 is stored by the system as file content in a normalized database at 106 and the publisher/user adds interactive touch device-centric features at 107 and the publisher/user further submits the app for publishing at 108. Web content at 105*a* is stored by the system at 106*a* in a normalized database and the system proceeds to addition of interactive touch device-device centric features at 107 and the publisher/user submits the App for publication at 108.

Figure 2:
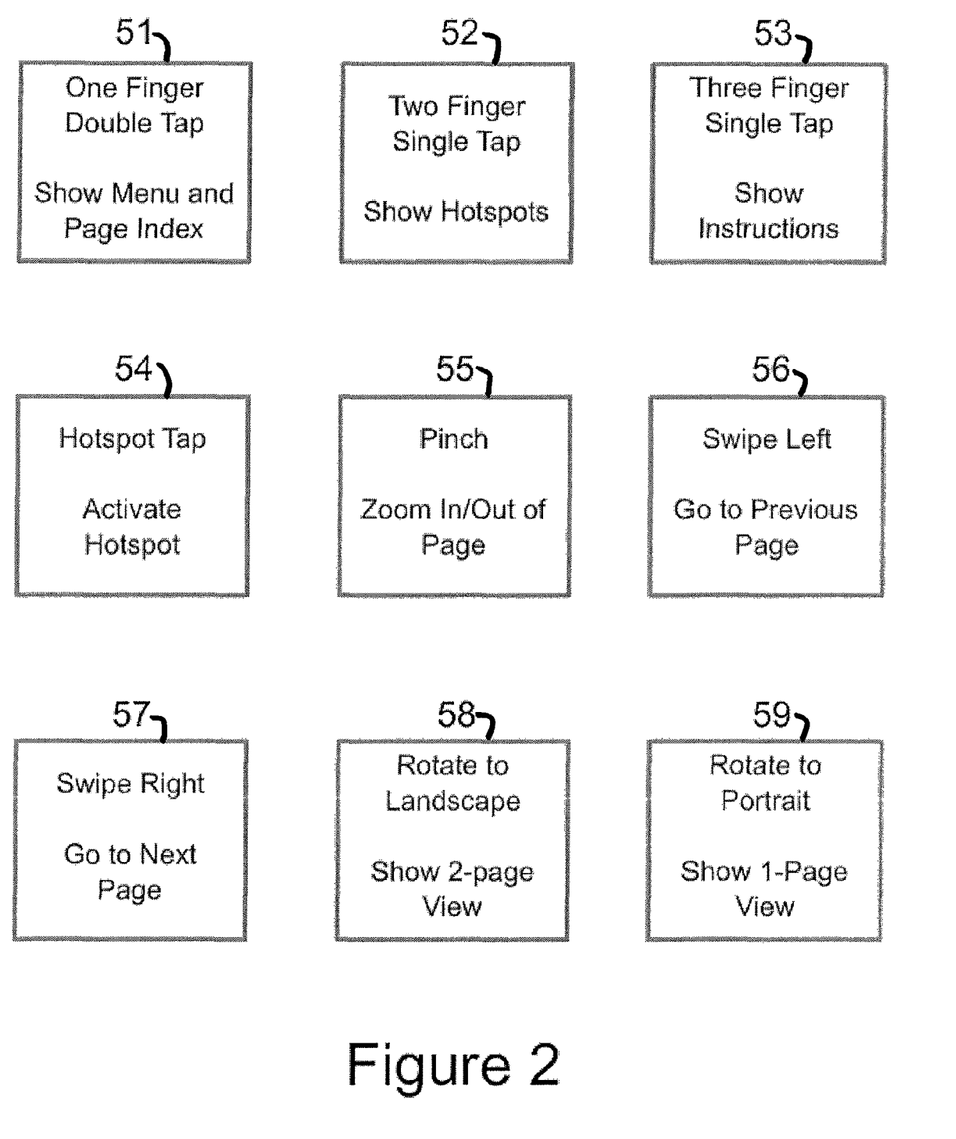
FIG. 2 depicts the manner in which hotspots are interacted with by an end user.

Standardized finger utilizations and movements are shown in the chart depiction 50 of FIG. 2, with one-finger double tap 51 used to show an appropriate menu and page index, two finger single tap 52 to show the hotspots, a three finger single tap 53 to show instructions, a one finger tap on a hot spot 54 to activate the hotspot function, a pinching (in or out) movement of thumb and forefinger 55 to zoom in or out of the page on the screen, a swipe of the screen to the left 56 to go to a previous page and a swipe to the right 57 to go to the next page. A rotation to landscape 58 effects a 2-page single screen view and a rotation to portrait 59 effects a 1-page single screen view.

Generally, the publisher/user inputs, configures and defines the design properties of the app and the publisher/user uploads a PDF or other supported file such as PNG, GIF, or a TIFF. If the publisher/user uploads a PDF, then the system processes the PDF by creating images for each page. If the publisher/user uploads an image file, then the system processes the image file by just storing the image properties in the database table and storing the physical file on a file system. The publisher/user is presented with a user-interface containing all the processed pages.

The publisher/user then navigates to the desired page by clicking on the page thumbnail and starts defining hotspots by dragging and dropping the selected hotspot type to a desired location on the page. The publisher/user sizes/re-sizes the hotspot region to desired dimensions, which will serve as the hotspot activator. The publisher/user configures the hotspot contents by uploading content such as videos, photos, or audio files, or defines the content by entering a URL for link hotspots, page numbers for internal links, or other type of supported hotspots. The publisher/user configures the hotspot layout properties such as scroll view, overlay view, or embedded view and then the publisher/user configures the hotspot overlay and indicator images such as overlay image to show on tap or hotspot indicator image to show on page load. The ser configures the table of contents for each article beginning and ending point in the app and the System saves all the hotspot geometry information to a database table. The System saves the hotspot layout, and overlay/indicator image properties to a database table.

Once the publisher/user has provided content and parameters, the back end of the system analyzes the provided content and parameters according to pre-set tables, to provide the requisite access meta-data, formatting for building apps for use with the different platforms and mobile device, and hotspot designations and accessing.

Figure 3:
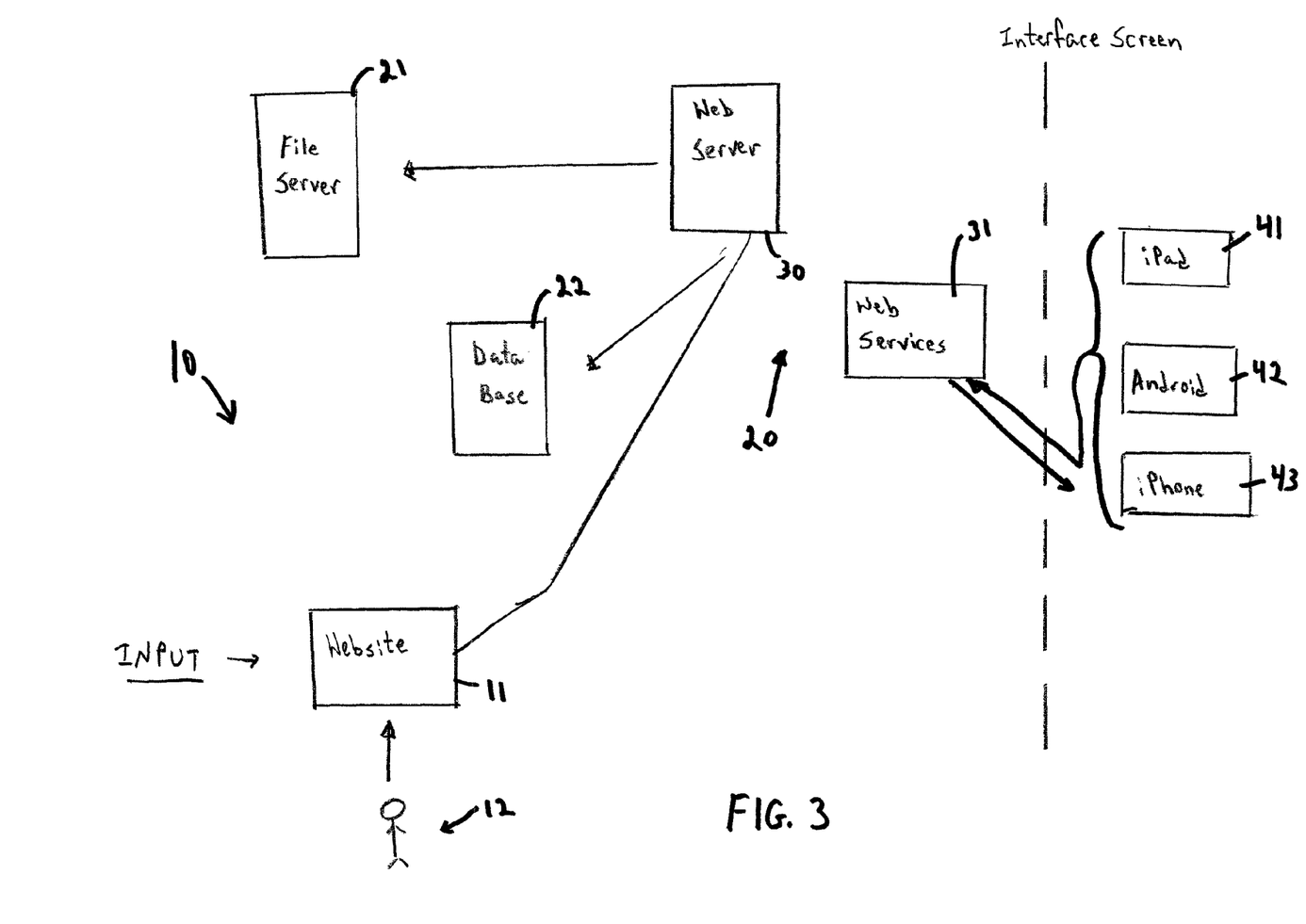
FIG. 3 is a block diagram showing the various components and operation of the front end and back end of the system of the present invention.

FIG. 3 depicts the system 10 with the various interfaces. At website access interface 11, the publisher/user 12, at the front end supplies content and parameters desired. At the back end 20 of the system, file server 21 stores the files and images provided by the publisher/user. Data base 22 stores the meta data of the content in the file server including image names and addresses and hotspot locations and operations. Web server 30 provides an interface between the system and an end user on the touch screen 31 of the device being utilized by the end user to access the published content and constitutes what the app allows the end user to see. Different apps are provided to the iPad tablet 41 and the Android tablet 42 as well as to the iPhone 43, all with different operating platforms and operational dimensions. Other tablets, smartphones and computers in general may be linked to the web server by applicable apps as available.

The web server 30 provides both the output to the end user and the input from the user/publisher and is linked to the system which effects the construction of the apps for use by the mobile devices 41, 42 and 43. Construction of the apps is effected automatically by the system with the input of parameters provided by the publisher/user by taking into account prior established table parameters for the requisite functions.

The following are examples of the specific tables and their operational functions:

The Issue table stores issue information: issue number, date of release, internal notes, price, currency, and modification date.

The Article table stores article information: title of article, page number where the article begins, and associated page issue identification.

The Page table stores page information: page number, associated issue id for this page, associated page file id (i.e. image representation), page file number, and orientation of the page (e.g., portrait, landscape).

The Page file table stores file information for the page: physical filename, page count, type of file and associated issue id for this file.

The Hotspot table stores hotspot information: geometry (x,y coordinates, width, and height) of the hotspot region, type of hotspot, page number, associated page issue id, layout of the hotspot, overlay media item, overlay placement.

The Hotspot content table stores relationships between a hotspot and text content.

The Media item table stores the location (source) of the media item file, associated user id and the type of media (i.e. photo, video, audio).

The Media gallery table stores the relationship between the media item and the hotspot content.

The Hotspot type table stores the type of hotspots available for definition.

Overlay placement table stores the types of overlay placements.

Layout hotspot table stores the layout for the hotspot.

Media item type table stores the types of media items.

Layout table stores the layout. (i.e. scrollview, embedded view, overlay view)

Layout media table stores the layout for the media.

It is understood that the above parameters, platforms, tables and the like are only illustrative of the present invention and that other parameters, platforms and tables and the like are possible as well as app building procedures. Changes in the method of content providing such as changes in interface types, analysis and publishing with or without apps and like are possible without departing from the scope of the present invention as defined in the following claims.

What is claimed is:

1. A method for enabling publishers to be able to provide content to a variety of mobile devices, with various native operating systems and HTML5 language by creation of an app accessible to reader/users, the method comprising the steps of:
   a) providing an accessible site, through which a publisher is able to provide page images of the content to be transferred to the mobile devices and to provide parameters encompassing desired viewability and desired interactive capability, and operation;
   b) configuring the accessible site to be capable of analyzing the input page images and desired parameters and to convert the input pages to be dimensioned and formatted according to viewing requirements of various available software platforms and mobile device types of various configurations;
   c) configuring the accessible site to provide the converted input pages with imbedded active multi-media accessible content and viewing files, hyperlinks, information, and operations, and accessible content comprising at least one of the group consisting of photo gallery, video gallery, audio gallery, RSS textbox info, pop-up map, internal page links, web links, tap-to-call, tap-to-email with optional purchasing of tapped item forms, with hot spots of various selected types at pre-selected locations on the page, for interactive operation therewith by reader users;
   d) the accessible site thereafter creating an app for dissemination by the publisher, with the app enabling readers or users to optimally view converted content and to interact with hotspots on different mobile devices, operating with different platforms, the app being available to the readers or users on the mobile device being used with specific platform being used.

2. The method of claim 1, wherein the app being created is provided with capability of providing the hotspots which are configured to be operable with touch screens of the mobile devices and are configured to be locatable at any region of the touch screen capable of exhibiting content, with the hot spots being activated with at least one of single and multiple finger touching and swiping, to provide content-related additional displays and action options.

3. The method of claim 1, wherein content provided by the publisher as a pdf is created as an image representation by creating an image file on a file system, for each page within the PDF, with each image representation being optimized to the optimal image properties for the supported devices to be viewable on, and thereafter physical files are stored in a configurable location on a file server behind a firewall and for each page, a record is created in a page table, with associating of the page with an issue in an issue table, with storing thereafter of logical file information of filename, type, and page count in a page file table.

4. The method of claim 1, wherein the app is configured to provide the interactive hot spots to permit the end users to access imbedded content including videos, photo galleries, animations, with, for each hotspot defined by the publisher/user, geometry thereof including X, Y, width, height is stored in a hotspot table, which is configured according to processing system and accessing mobile devices, wherein for each hotspot content item provided by the publisher, content information is stored in a hot spot content table, which is associated to a particular hotspot in the hotspot table with for each hotspot property, hotspot layout is stored in a layout hotspot table, and any overlay is stored in an overlay placement table.

5. The method of claim 1, wherein publishing for the readers or users to optimally view converted content and to interact with hotspots on different mobile devices is effected by markings the app as a request to be published, and sending out an email notification to an administrator with a publishing sub-system polling on a predetermined interval basis to determine which apps need to be built, with the publishing sub-system fetching a next available app to be built and creating the configuration file containing an AppID, with the publishing sub-system compiling the app using native OS code and saving the app in preparation for submission to an app store.

6. The method of claim 1, wherein the readers or users are enabled to view the converted content by the steps of: the user tapping a screen of the mobile device on the publication to view it, with the page images being fetched, based on the following image-fetching algorithm of:
   a) fetching current page,
   b) fetching current page and two succeeding pages, in preparation for the possibility of the user going to one of the next two pages to keep performance optimal,
   c) fetching current page and two preceding pages, in preparation for the possibility of the user going to one of the prior two pages to keep performance optimal,
   d) fetching current page hotspot information,
   e) fetching current page hotspot information, and hotspot information of one succeeding page,
   f) fetch current page hotspot information, and hotspot information of one preceding page,
   wherein the pages are stored on a local file system of the device, in order to increase performance during the app use and to also allow for offline reading when the mobile device is not connected to the Internet, and, wherein, when the readers or users instantiate a pages index view, thumbnails of each page within the app are fetched, which render a page in a layout as initially chosen by the publisher during original building process of the app; and when the end user taps on a page within the page index, a page image is fetched and presented to the readers or users for instantiating the page image-fetching algorithm.

7. The method of claim 1, wherein the readers or users are enabled to interact with the hotspots by executing one of finger swiping or tapping gestures on a touch screen of the mobile device to initiate a desired action, with the type of gestures configured to determine an interactive action with a code base determining if a location of the tap is a hotspot region, wherein if the tap is within defined hotspot geometry boundaries, the app determines the type of hotspot and appropriate actions are then initiated and wherein if a single-tap is effected with two fingers, the hotspot region boundaries are configured to be shown for each finger hotspot and with appropriate actions then being effected.

8. The method of claim 1, wherein the hotspot app can is further configured to track, when the readers or users tap on a hotspot, with such tapping data being stored on a server, with information being tracked including at least one of: hotspot type, geolocation of an end-user who tapped on hotspot, date/time when the end-user tapped on hotspot, and end-user device id, with the information being stored on the server and which information can later be reported on.

9. The method of claim 1, wherein, in order to permit the optional purchasing hotspot configuration the app is configured so that, the publisher defines hotspots in which an end-user can purchase content, items, good or services, and when an end-user taps on the hotspot the app renders a screen to allow the end-user to add the item to his/her cart for immediate purchase.

10. The method of claim 1, wherein the app is configured to permit published content to be shared via social networking systems with the published material being configured such that an end-user is able to select any region on the viewed page image as a "clipping" and to send the clipping to anyone via social media wherein the end-user uses a finger to draw the region which defines the clipping content to be shared with a pre-determined shape of an enclosing polygon being created for the selected drawn region, with the selected drawn region then being made into an image capable of being shared.

* * * * *